(12) United States Patent
Tong et al.

(10) Patent No.: US 12,519,793 B2
(45) Date of Patent: Jan. 6, 2026

(54) INPUT ACCESS CONTROLS FOR WEB CONFERENCE SESSION

(71) Applicant: CITRIX SYSTEMS, INC., Fort Lauderdale, FL (US)

(72) Inventors: Dan Tong, Nanjing (CN); Yuran Ou, Nanjing (CN)

(*) Notice: Subject to any disclaimer, the term of this patent is extended or adjusted under 35 U.S.C. 154(b) by 720 days.

(21) Appl. No.: 17/722,737

(22) Filed: Apr. 18, 2022

(65) Prior Publication Data

US 2023/0308446 A1    Sep. 28, 2023

Related U.S. Application Data

(63) Continuation of application No. PCT/CN2022/082167, filed on Mar. 22, 2022.

(51) Int. Cl.
*H04L 9/40* (2022.01)
*G06F 3/0482* (2013.01)
*H04L 12/18* (2006.01)

(52) U.S. Cl.
CPC .......... *H04L 63/101* (2013.01); *G06F 3/0482* (2013.01); *H04L 12/1822* (2013.01); *H04L 63/0861* (2013.01)

(58) Field of Classification Search
CPC .............. H04L 63/101; H04L 12/1822; H04L 63/0861; G06F 3/0482

USPC ................................................ 726/4; 709/224
See application file for complete search history.

(56) References Cited

U.S. PATENT DOCUMENTS

| | | | |
|---|---|---|---|
| 7,187,767 B2* | 3/2007 | Ghomeshi ............. | H04M 1/724 379/202.01 |
| 2006/0103733 A1* | 5/2006 | Grady ..................... | G06F 3/038 348/208.3 |
| 2009/0293136 A1* | 11/2009 | Campbell .............. | G08B 13/19 726/34 |
| 2015/0304121 A1* | 10/2015 | Wu ...................... | H04L 65/1094 709/204 |
| 2016/0027134 A1* | 1/2016 | Alvarado ............ | H04L 12/1818 705/311 |

\* cited by examiner

*Primary Examiner* — Liang Che A Wang

(57) ABSTRACT

A method may include detecting, at a first client device engaged in a web conference session with a second client device, a selection of a user interface element associated with a first input mode in which at least a portion of content captured at the first client device is excluded from being shared with the second client device. In response to the selection of the user interface element, the first input mode may be activated at the first client device by disabling multiple input devices associated with the first client device such that at least the portion of the content captured at the first client device is excluded from being shared with the second client device. Meanwhile, when a second input node is activated at the first client device, the content captured at the first client device may be shared with the second client device without restrictions.

20 Claims, 8 Drawing Sheets

INPUT ACCESS CONTROLS FOR WEB CONFERENCE SESSION

CROSS REFERENCE TO RELATED APPLICATIONS

This application is a Bypass Continuation Application of International Application No. PCT/CN2022/082167, filed Mar. 22, 2022 and entitled "INPUT ACCESS CONTROLS FOR WEB CONFERENCE SESSION," the disclosure of which is incorporated herein by reference in its entirety.

TECHNICAL FIELD

The subject matter described herein relates generally to web conferencing and more specifically to input controls during a web conference session.

BACKGROUND

A web conferencing application may provide access to a virtual meeting room in which multiple users in different locations may engage in real time audio data and/or video communication. The web conferencing application may support a variety of online communication sessions between two or more web-connected devices including, for example, meetings, training events, lectures, presentations, and/or the like. In some cases, the web conferencing application may also provide various collaborative features such as real time content sharing and editing.

SUMMARY

Methods, systems, and articles of manufacture, including computer program products, are provided for input controls during a web conference session. In one aspect, there is provided a system including at least one data processor and at least one memory. The at least one memory may store instructions, which when executed by the at least one data processor, cause the at least one data processor to at least: detect, at a first client device engaged in a web conference session with a second client device, a selection of a user interface element associated with a first input mode in which at least a portion of content captured at the first client device is excluded from being shared with the second client device; in response to the selection of the user interface element, activate the first input mode at the first client device by at least disabling a plurality of input devices associated with the first client device such that at least the portion of the content captured at the first client device is excluded from being shared with the second client device; and in response to an activation of a second input mode at the first client device, share, with the second client device, the content captured at the first client device without restrictions.

In some variations, one or more of the features disclosed herein including the following features can optionally be included in any feasible combination. The at least one data processor may be further caused to at least: detect a deactivation of the first input mode at the first client device; and detect, based at least on the deactivation of the first input mode, the activation of the second input mode at the first client device.

In some variations, the deactivation of the first input mode may be detected based on a deselection of the user interface element associated with the first input mode or a selection of another user interface element associated with the first input mode.

In some variations, the user interface element may include one or more of a button, a radio button, a checkbox, a toggle, and a dropdown menu.

In some variations, the first input mode may be activated further in response to detecting a presence of unauthorized user and/or unauthorized content at the first client device.

In some variations, the presence of unauthorized user and/or unauthorized content may be detected by applying one or more machine vision algorithms, voice recognition algorithms, and natural language processing (NLP) algorithms.

In some variations, the first input mode may be further activated by at least filtering the content captured at the first client device to remove the unauthorized content and/or at least the portion of the content associated with the unauthorized user.

In some variations, the filtering of the content captured at the first client device may be performed at the first client device and/or a web conference server.

In some variations, the plurality of input devices may include two or more of a keyboard, a mouse, a microphone, and a camera associated with the first client device. In some variations, the at least one data processor may be further caused to at least: respond to the activation of the second input mode at the first client device by at least enabling the plurality of input devices that are disabled while the first client device is in the first input mode.

In another aspect, there is provided a method for input controls during a web conference session. The method may include: detecting, at a first client device engaged in a web conference session with a second client device, a selection of a user interface element associated with a first input mode in which at least a portion of content captured at the first client device is excluded from being shared with the second client device; in response to the selection of the user interface element, activating the first input mode at the first client device by at least disabling a plurality of input devices associated with the first client device such that at least the portion of the content captured at the first client device is excluded from being shared with the second client device; and in response to an activation of a second input mode at the first client device, sharing, with the second client device, the content captured at the first client device without restrictions.

In some variations, one or more of the features disclosed herein including the following features can optionally be included in any feasible combination. The method may further include: detecting a deactivation of the first input mode at the first client device, the deactivation of the first input mode being detected based on a deselection of the user interface element associated with the first input mode or a selection of another user interface element associated with the first input mode; and detecting, based at least on the deactivation of the first input mode, the activation of the second input mode at the first client device.

In some variations, the user interface element may include one or more of a button, a radio button, a checkbox, a toggle, and a dropdown menu.

In some variations, the first input mode may be activated further in response to detecting a presence of unauthorized user and/or unauthorized content at the first client device.

In some variations, the presence of unauthorized user and/or unauthorized content may be detected by applying one or more machine vision algorithms, voice recognition algorithms, and natural language processing (NLP) algorithms.

In some variations, the first input mode may be further activated by at least filtering the content captured at the first client device to remove the unauthorized content and/or at least the portion of the content associated with the unauthorized user.

In some variations, the filtering of the content captured at the first client device may be performed at the first client device and/or a web conference server.

In some variations, the plurality of input devices may include two or more of a keyboard, a mouse, a microphone, and a camera associated with the first client device.

In some variations, the method may further include: responding to the activation of the second input mode at the first client device by at least enabling the plurality of input devices that are disabled while the first client device is in the first input mode.

In another aspect, there is provided a non-transitory computer readable medium storing instructions that cause operations when executed by at least one data processor. The operations may include: detecting, at a first client device engaged in a web conference session with a second client device, a selection of a user interface element associated with a first input mode in which at least a portion of content captured at the first client device is excluded from being shared with the second client device; in response to the selection of the user interface element, activating the first input mode at the first client device by at least disabling a plurality of input devices associated with the first client device such that at least the portion of the content captured at the first client device is excluded from being shared with the second client device; and in response to an activation of a second input mode at the first client device, sharing, with the second client device, the content captured at the first client device without restrictions.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to controlling input access during a web conferencing session, it should be readily understood that such features are not intended to be limiting. The claims that follow this disclosure are intended to define the scope of the protected subject matter.

DESCRIPTION OF DRAWINGS

When practical, like reference symbols in the various drawings indicate like elements.

DETAILED DESCRIPTION

A web conferencing application, which provides access to a virtual meeting room, may allow multiple users in different geographical locations to engage in a web conference session during which each user may contribute, in real time, a variety of content including, for example, text messages, audio data, video data, and/or the like. For example, a web conference session may include multiple attendees including a host who is responsible for scheduling the web conference session. Content captured at the client device of one attendee, for example, by a keyboard, a mouse, a microphone, and/or a camera associated with that client device, may be shared and output at the client devices of the other attendees. In some cases, content available at the client device of one attendee may be shared when that attendee acts as a presenter and activates a screen sharing functionality. Doing so may allow the presenter to share at least a portion of the content displayed at the client device of the presenter and have that content be displayed at the client devices of the other attendees. Moreover, the web conferencing application may also support a variety of collaborative features such as real time editing of the shared content.

Not all content input at the client device of an attendee may be suitable for sharing with the other attendees of a web conference session. For example, when an unauthorized user (e.g., a user who is not authorized to participate in the web conference session) contributes content through the client device of one attendee, that content may be unsuitable for sharing with the other attendees of the web conference session. Conventional web conference applications do not provide an efficient mechanism to prevent the sharing of at least a portion of the content input at the client device including, for example, content captured by one or more of the keyboard, mouse, microphone, and/or camera associated with that client device. As such, in some example embodiments, a web conference application may support multiple input modes including a first input mode in which input is at least partially restricted and a second input mode in which input is unrestricted. When the first input mode is activated at the client device of an attendee of a web conference session, inputs from at least one of the input devices associated with that client device may be excluded from being shared with the other attendees of the web conference session. Contrastingly, when the second input mode is activated at the client device, inputs from the input devices associated with the client device may be shared without any exclusions.

Figure 1:
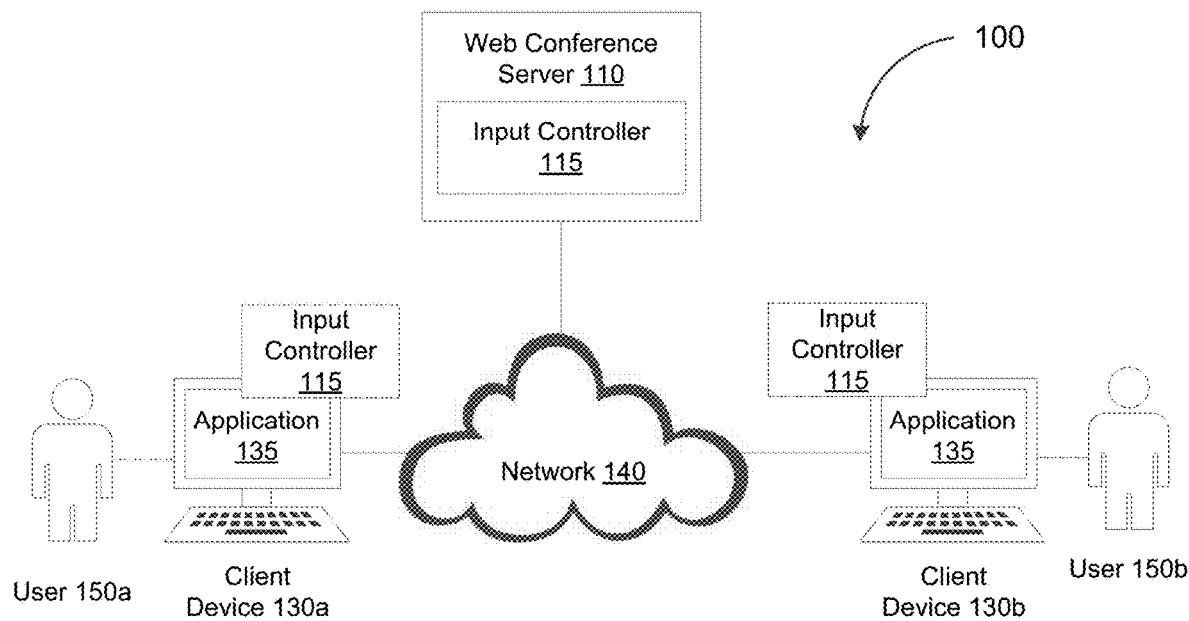
FIG. 1 depicts a system diagram illustrating an example of a web conferencing system, in accordance with some example embodiments.

FIG. 1 depicts a system diagram illustrating an example of a web conferencing system 100, in accordance with some example embodiments. Referring to FIG. 1, the web conferencing system 100 may include a web conference server 110 that is communicatively coupled via a network 140 with one or more client devices 130 including, for example, a first client device 130a, a second client device 130b, and/or the like. The one or more client devices 130 may be processor-based devices including, for example, a smartphone, a personal computer, a tablet computer, a wearable apparatus, an Internet-of-Things (IoT) appliance, and/or the like. The network 140 may be a wired network and/or a wireless network including, for example, a local area network (LAN), a virtual local area network (VLAN), a wide area network (WAN), a public land mobile network (PLMN), the Internet, and/or the like.

A web conferencing application 135 associated with the web conference server 110 may be deployed at each of the one or more client devices 130. The web conferencing application 135 may be configured to provide access to a virtual meeting room in which multiple attendees, such as a first user 150a at the first client device 130a and a second user 150b at the second client device 130b, may participate in a web conference session during which a variety of data (e.g., text messages, audio data, video data, and/or the like) are exchanged in real time. In some cases, the web conferencing application 135 may be a cloud-based software application that is hosted at a central server, such as the web conference server 110, on one or more virtual machines. Alternatively and/or additionally, the web conferencing application 135 may be provided as part of a workspace in a virtual desktop, such as a high definition virtual desktop, in which case the functionalities of the web conferencing application 135 may be accessible during a virtual desktop session.

Referring again to FIG. 1, content captured at the first client device 130a of the first user 150a during a web conference session, for example, by a keyboard, a mouse, a microphone, and/or a camera associated with the first client device 130a, may be shared and output at the client devices of the other attendees of the web conference session, such as the second client device 130b of the second user 150b. In some cases, content available at the first client device 130a may be shared when that the first user 150a acts as a presenter and activates a screen sharing functionality associated with the web conferencing application 135. By activating the screen sharing functionality, at least a portion of the content displayed at the first client device 130a may be shared and displayed at the client devices of the other attendees of the web conference session including the second client device 130b of the second user 150b. The web conferencing application 135 may also support a variety of collaborative features such as real time editing of the shared content.

Not all content input at the first client device 130a may be suitable for sharing with the other attendees of the web conference session. For example, when an unauthorized user (e.g., a user who is not authorized to participate in the web conference session) contributes content through the first client device 130a of the first user 150a, that content may be unsuitable for sharing with the second user 150b at the second client device 130b. Accordingly, in some example embodiments, the web conference application 135 may be associated with an input controller 115, which may be deployed at the web conferencing server 110, the first client device 130a, and/or the second client 130b to support multiple input modes including a first input mode in which input is at least partially restricted and a second input mode in which input is unrestricted. For instance, when the input controller 115 detects that the first input mode is activated at the first client device 130a, the input controller 115 may prevent inputs from at least one of the input devices associated with the first client device 130a from being shared with the second client device 130b. Alternatively, when the input controller 115 detects that the second input mode is activated at the first client device 130a, inputs from the input devices associated with the first client device 130a may be shared with the second client device 130b without any exclusions.

In some example embodiments, the input controller 115 may detect the activation of the first input mode and/or the second input mode in a variety of manner. For example, the web conference application 135 may provide, for display at the one or more client devices 130 engaged in the web conference session, one or more user interface (UI) elements. The first input mode and the second input mode may be activated and deactivated by selecting the one or more user interface (UI) elements. To facilitate the activation and deactivation of the first input mode and/or the second input mode, the web conference application 135 may provide a single user interface (UI) element (e.g., a button, a radio button, a checkbox, a toggle, a dropdown menu, and/or the like) for activating and deactivating one or more of the first input mode and the second input mode. In some instances, the user interface (UI) element may enable a transition between the first input mode and the second input mode such that activating the first input mode also deactivates the second input mode and deactivating the first input mode also activates the second input mode.

Alternatively, the activation and deactivation of the first input mode and the second input mode may be triggered by the input controller 115 upon detecting the presence of unauthorized users and/or unauthorized content at the one or more client devices 130. For example, the input controller 115 may apply one or more machine vision algorithms, voice recognition algorithms, and natural language processing (NLP) algorithms to detect the presence of unauthorized users and/or unauthorized content at the first client device 130a and activate the first input mode such that at least a portion of the content captured at the first client device 130a is excluded from being shared with the second client device 130b. The exclusion of content captured at the first client device 130a may include deactivating some or all of the input devices at the first client device 130a including, for example, a mouse, a keyboard, a camera, a microphone, and/or the like. Alternatively and/or additionally, the exclusion of content captured at the first client device 130a may include filtering the content captured at the first client device 130*a* to remove content associated with the unauthorized users before the filtered content is shared with the second client device 130*b*.

Figure 2:
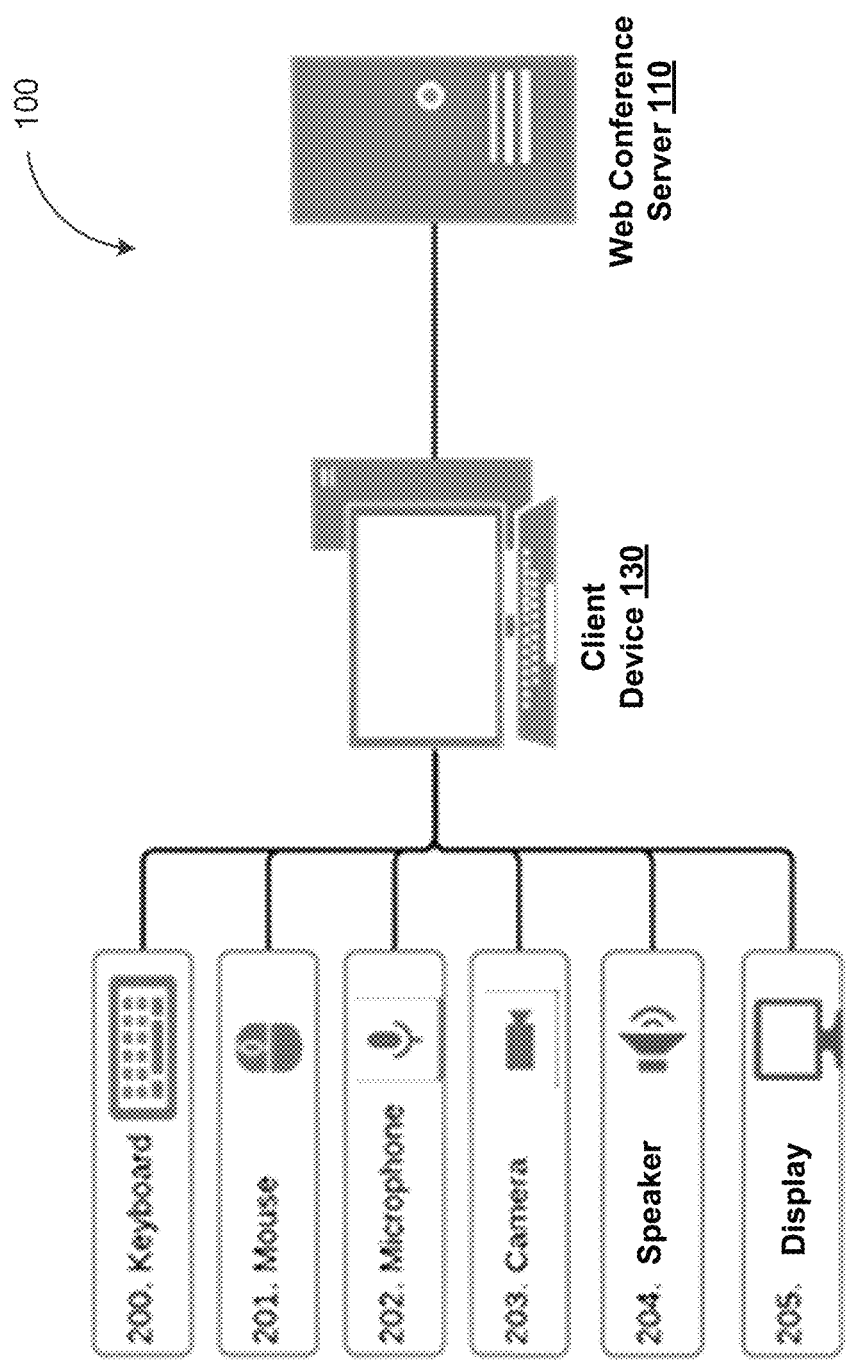
FIG. 2 depicts a block diagram illustrating an example of system architecture for a web conferencing system, in accordance with some example embodiments.

To further illustrate, FIG. 2 depicts a block diagram illustrating an example of system architecture for the web conferencing system 100, in accordance with some example embodiments. As shown in FIG. 2, the client device 130 may include one or more input devices such as a keyboard 200, a mouse 201, a microphone 202, and a camera 203. Moreover, as shown in FIG. 2, the client device 130 may also include one or more output devices such as a speaker 204 and a display 205. When the input controller 115 activates the first input mode at the first client device 130*a*, the input controller 115 may prevent at least a portion of the content captured by one or more of the keyboard 200, the mouse 201, the microphone 202, and the camera 203 associated with the first client device 130*a* from being shared with and output at the second client device 130*b*, for example, by the speaker 204 and/or the display 205 associated with the second client device 130*b*.

Figure 3A:
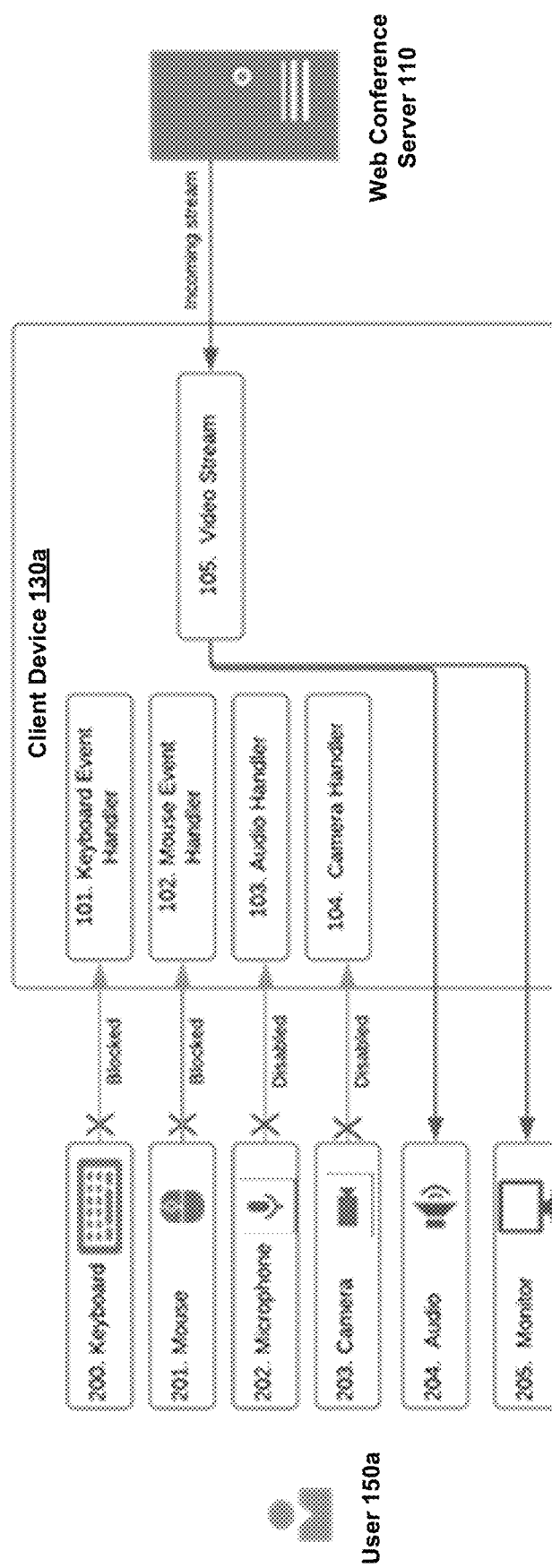
FIG. 3A depicts a schematic diagram illustrating an example of a web conference session in which a limited input mode is activated, in accordance with some example embodiments.

FIG. 3A depicts a schematic diagram illustrating an example of a web conference session in which the first input mode is activated (and the second input mode is deactivated) at the first client device 130*a*. As noted, the input controller 115 may activate the first input mode at the first client device 130*a* in response to receiving, at the first client device 130*a*, one or more user inputs activating the first input mode. Alternatively, the input controller 115 may activate the first input mode at the first client device 130*a* in response to detecting the presence of unauthorized users and/or unauthorized content at the first client device 130*a*. As shown in FIG. 3A, when the first input mode is activated at the first client device 130*a*, some or all of the keyboard 201, the mouse 202, the microphone 202, and the camera 203 may be blocked or disabled to prevent at least a portion of the content captured at the first client device 130*a* from being sent to the web conference server 110 and shared with the second client device 130*b* (e.g., as a part of a video stream 105).

As shown in FIG. 3A, the input devices associated with the first client device 130*a* may generate individual event streams. Accordingly, when the first client device 130*a* is in the first input mode, the event stream associated with one or more of the input devices may be blocked or disabled in order to prevent the corresponding content from being sent to the web conference server 110 and shared with the second client device 130*b* (e.g., as a part of a video stream 105). For example, as shown in FIG. 3A, when the first client device 130*a* is in the first input mode, the keyboard event handler 101 may ignore inputs from the keyboard 200 and/or the mouse event handler 102 may ignore inputs from the mouse 201, with the exception of inputs associated with the activation and deactivation of the first input mode and/or the second input mode. Alternatively and/or additionally, when the first client device 130*a* is in the first input mode, the audio handler 103 may disable the microphone 202 and/or the camera handler 104 may disable the camera 203 such that audio data and/or video data from the first user 150*a* are not received at the first client device 130*a*.

In some example embodiments, activating the first input mode at the first client device 130*a* may include disabling multiple input devices associated with the first client device 130*a*. As noted, the first input mode may be activated and deactivated by selecting a single user interface (UI) element associated with the web conferencing application 135. Accordingly, it should be appreciated that the disabling of multiple input devices associated with the first client device 130*a* may be achieved at once by selecting a single user interface (UI) element.

In some example embodiments, activating the first input mode at the first client device 130*a* may include disabling a customizable set of input devices associated with the first client device 130*a*. For example, when the first input mode is activated at the first client device 130*a*, all of the input devices associated with the first client device 130*a*, including the keyboard 200, the mouse 201, the microphone 202, and the camera 203, may be blocked or disabled from capturing content at the first client device 130*a*. Alternatively, activating the first input mode at the first client device 130*a* may include deactivating some but not all of the input devices associated with the first client device 130*a*. For instance, when the first input mode is activated at the first client device 130*a*, the microphone 202 and the camera 203 may be disabled but the keyboard 200 and the mouse 201 may remain active.

Figure 3B:
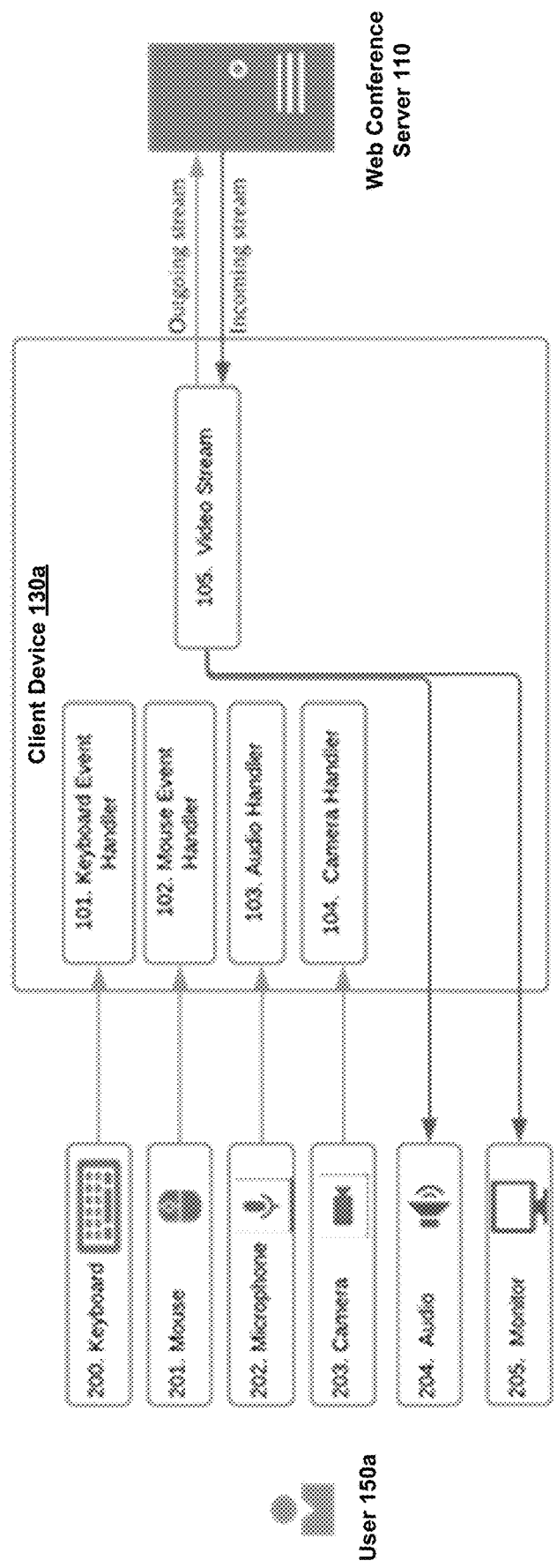
FIG. 3B depicts a schematic diagram illustrating an example of a web conference session in which a limited input mode is deactivated, in accordance with some example embodiments.

FIG. 3B depicts a schematic diagram illustrating an example of a web conference session in which the first input mode is deactivated (and the second input mode is activated) at the first client device 130*a*. As shown in FIG. 3B, deactivating the first input mode at the first client device 130*a* may include unblocking or enabling one or more of the input devices (e.g., the keyboard 200, the mouse 201, the microphone 202, and/or the camera 203) that were blocked and/or disabled while the first client device 130*a* is in the first input mode. Accordingly, when the first input mode is deactivated at the first client device 130*a*, content captured at the first client device 130*a*, for example, by the keyboard 200, the mouse 201, the microphone 202, and the camera 203, may be sent to the web conference server 110 and shared with the second client device 130*b* (e.g., as a part of the video stream 105) without any restrictions.

Figure 4:
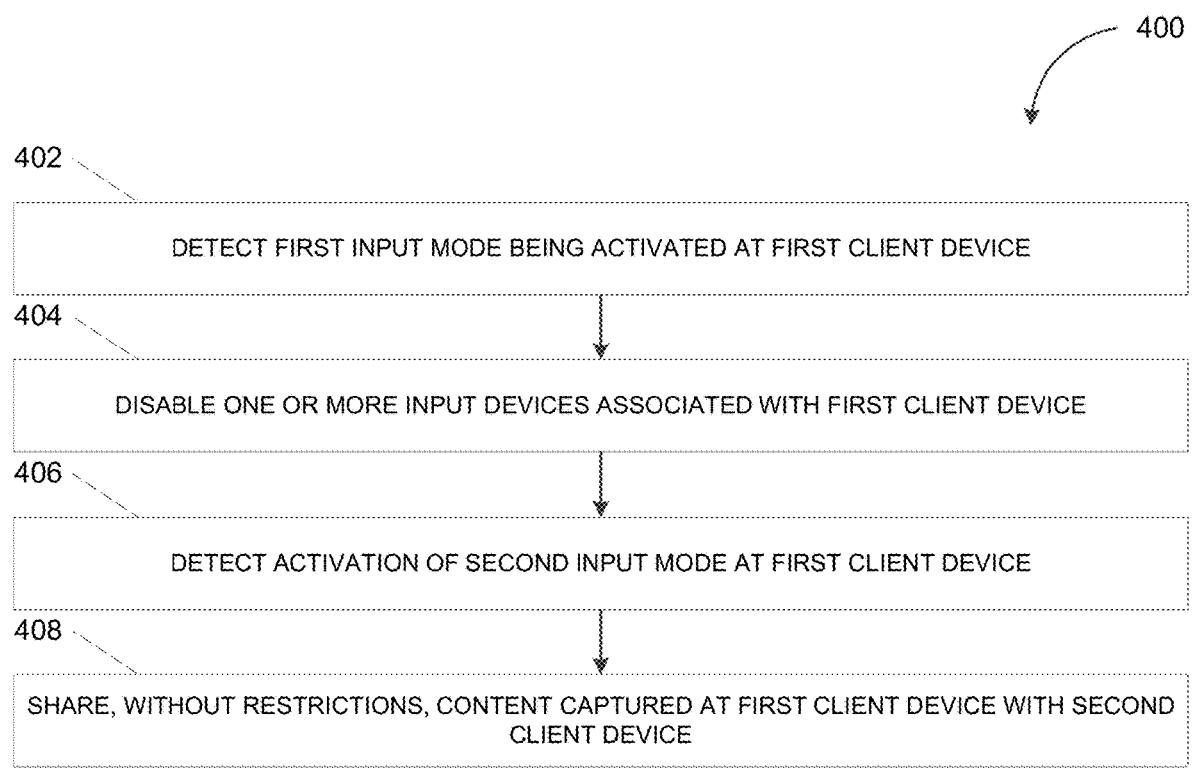
FIG. 4 depicts a flowchart illustrating an example of process for input access control during a web conference session, in accordance with some example embodiments.

FIG. 4 depicts a flowchart illustrating an example of process 400 for input access control during a web conference session, in accordance with some example embodiments. Referring to FIG. 4, the process 400 may be performed by the input controller 115 in order to control the content that is shared during a web conference session between the first user 150*a* at the first client device 130*a* and the second user 150*b* at the second client device 130*b*. As noted, the input controller 115 may be deployed at the web conference server 110, the first client device 130*a*, and/or the second client device 130*b*.

At 402, the input controller 115 may detect a first input mode being activated at a first client device. In some example embodiments, the input controller 115 may detect the first input mode being activated at the first client device 130*a* based on the selection of one or more user interface (UI) elements associated with the web conferencing application 135. In some cases, the web conference application 135 may provide a single user interface (UI) element (e.g., a button, a radio button, a checkbox, a toggle, a dropdown menu, and/or the like) for activating and deactivating one or more of the first input mode and the second input mode, in which case multiple input devices associated with the first client device 130*a* may be disabled and enabled by selecting a single user interface (UI) element. Alternatively and/or additionally, the input controller 115 may activate the first input mode in response to detecting the presence of unauthorized users and/or unauthorized content at the one or more client devices 130. The detection of unauthorized users and/or unauthorized content may be achieved by the input controller 115 applying one or more machine vision algorithms, voice recognition algorithms, and natural language processing (NLP) algorithms.

At 404, the input controller 115 may respond to the activation of the first input mode by disabling one or more input devices associated with the first client device. In some example embodiments, the input controller 115 may respond to the activation of the first input mode at the first client device 130a by at least disabling some, all, or a customizable set of input devices associated with the first client device 130a. For example, the input controller 115 may respond to the first input mode being activated at the first client device 130a by disabling one or more of the keyboard 200, the mouse 201, the microphone 202, and the camera 203 associated with the first client device 130a. Doing so may prevent at least a portion of the content captured at the first client device 130a from being sent to the web conference server 110 and shared with the second client device 130b, for example, as part of the video stream 105. Alternatively, at least a portion of the content captured at the first client device 130a may be excluded from sharing with the second client device 130b by at least filtering the content captured at the first client device 130a to remove content associated with the unauthorized users before the filtered content is shared with the second client device 130b.

At 406, the input controller 115 may detect an activation of a second input mode the first client device. In some example embodiments, the input controller 115 may detect the second input mode being activated at the first client device 130a based on the selection of one or more user interface (UI) elements associated with the web conferencing application 135. In some cases, selecting the one or more user interface (UI) elements may trigger a transition between the first input mode and the second input mode such that activating the first input mode also deactivates the second input mode and deactivating the first input mode also activates the second input mode.

At 408, the input controller 115 may respond to the activation of the second input mode by at least sharing, without restrictions, the content captured at the first client device with the second client device. For example, when the second input mode is activated at the first client device 130a, one or more of the input devices (e.g., the keyboard 200, the mouse 201, the microphone 202, and/or the camera 203) that were blocked and/or disabled while the first client device 130a is in the first input mode may be unblocked or enabled. Accordingly, when the first input mode is deactivated at the first client device 130a, content captured at the first client device 130a, for example, by the keyboard 200, the mouse 201, the microphone 202, and the camera 203, may be sent to the web conference server 110 and shared with the second client device 130b (e.g., as a part of the video stream 105) without any restrictions.

Figure 5A:
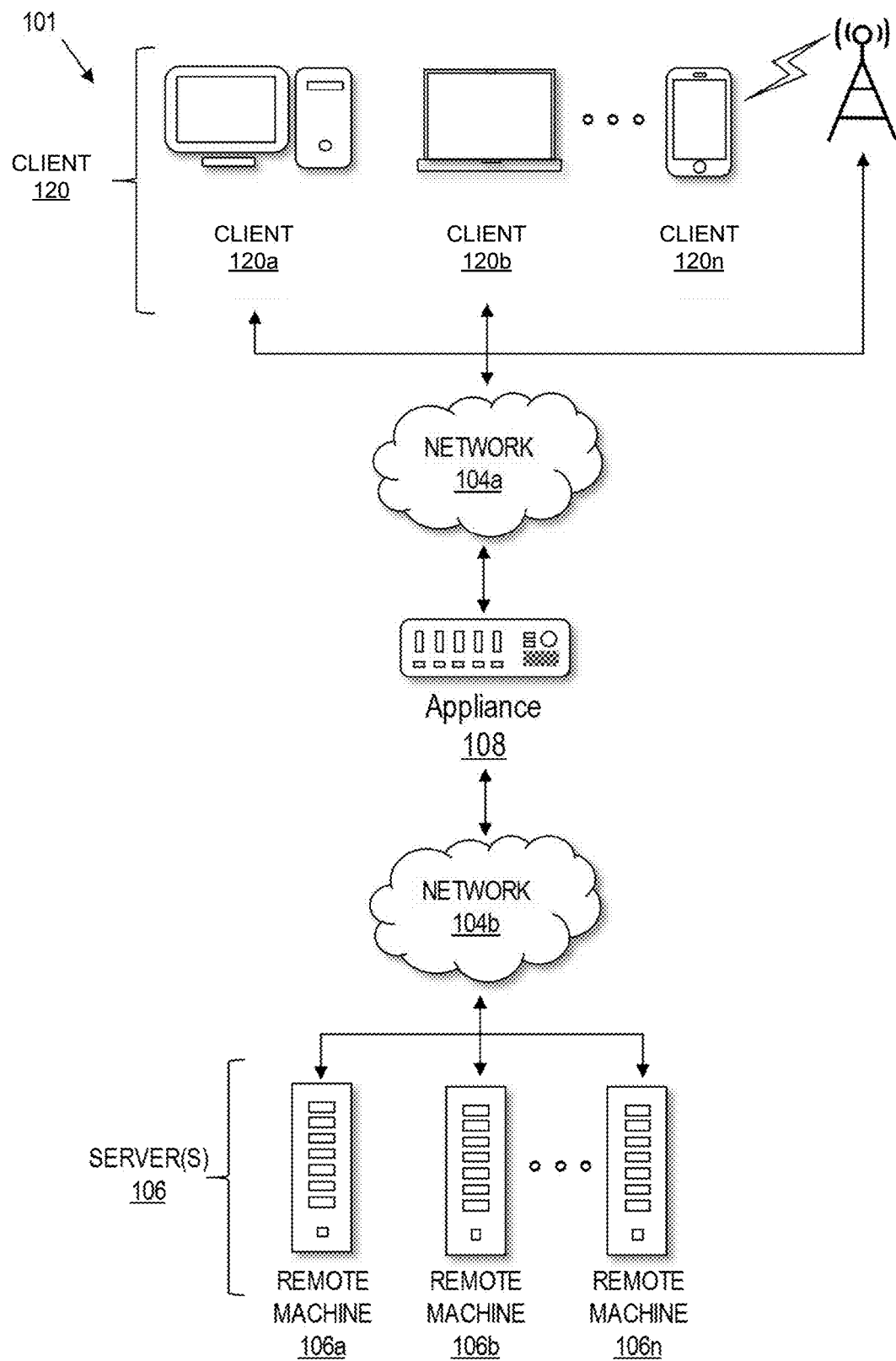
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1-4 and 5A, the network environment 101 in which various aspects of the disclosure may be implemented may include one or more clients 120a-120n, one or more remote machines 106a-106n, one or more networks 104a and 104b, and one or more appliances 108 installed within the network environment 101. The clients 120a-120n communicate with the remote machines 106a-106n via the networks 104a and 104b.

In some example embodiments, the clients 120a-120n may communicate with the remote machines 106a-106n via an appliance 108. The illustrated appliance 108 is positioned between the networks 104a and 104b, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104a and/or 104b.

The clients 120a-120n may be generally referred to as client machines, local machines, clients, client nodes, client computers, client devices, computing devices, endpoints, or endpoint nodes. One or more of the clients 120a-120n may implement, for example, the first client device 130a, the second client device 130b, the third client device 130c, and/or the like. The remote machines 106a-106n may be generally referred to as servers or a server farm. In some example embodiments, a client 120 may have the capacity to function as both a client node seeking access to resources provided by a server 106 and as a server 106 providing access to hosted resources for other clients 120a-120n. The networks 104a and 104b may be generally referred to as a network 104. The network 104 including the networks 104a and 104b may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the resource controller 115 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 120.

In yet other example embodiments, a server 106 may execute a virtual machine, such as the first virtual machine 125a and/or the second virtual machine 125b, to provide, for example, to the user 150 at the client device 130, access to a computing environment such as the application 135. The virtual machine may be managed by, for example, a hypervisor (e.g., the first hypervisor 165a, the second hypervisor 165b, and/or the like), a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
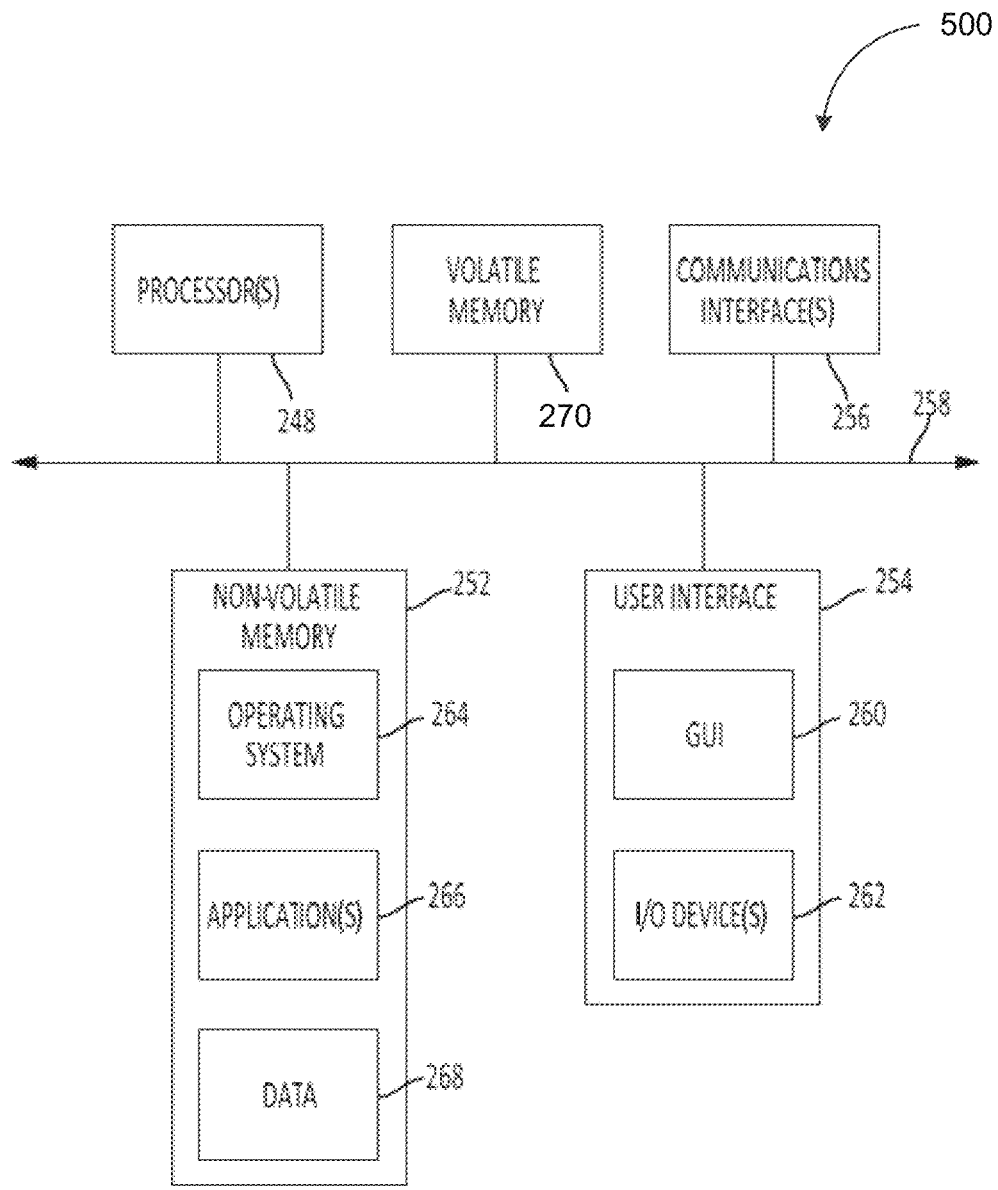
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1-4 and 5A-B, the computing device 500 may be useful for practicing an embodiment of the migration controller 110 and the client device 130.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the migration controller 110 and the client device 130 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session (e.g., associated with the application 135), may execute a terminal services session to provide a hosted desktop environment, or may provide access to a computing environment including one or more of: one or more applications, one or more desktop applications, and one or more desktop sessions in which one or more applications may execute.

Figure 5C:
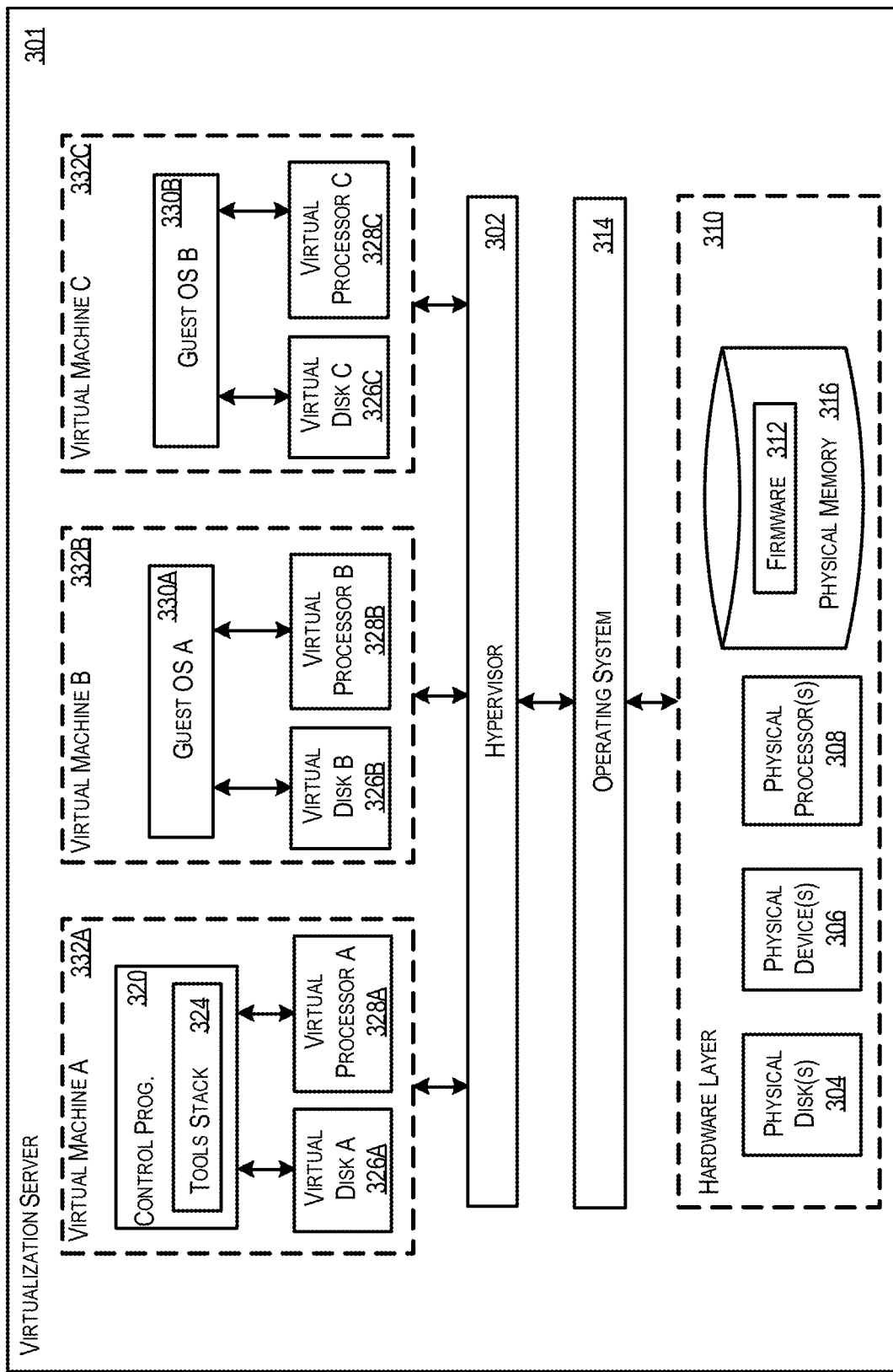
FIG. 5C depicts a high-level architecture of an example of a virtualization system for implementing a computing system, in accordance with some example embodiments.

FIG. 5C depicts a high-level architecture of an example of a virtualization system for implementing the computing system 110, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120a-c. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Florida.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the least one data processor, cause the at least one data processor to at least:
   detect, at a first client device engaged in a web conference session with a second client device, a selection of a user interface element associated with a first input mode in which at least a portion of content captured at the first client device is excluded from being shared with the second client device;
   in response to the selection of the user interface element, activate the first input mode at the first client device by at least disabling a plurality of input devices associated with the first client device such that at least the portion of the content captured at the first client device is excluded from being shared with the second client device; and
   in response to an activation of a second input mode at the first client device, share, with the second client device, the content captured at the first client device without restrictions;
   wherein:
   the first input mode is activated further in response to detecting a presence of unauthorized user and/or unauthorized content at the first client device; and
   the presence of unauthorized user and/or unauthorized content is detected by applying one or more machine vision algorithms, voice recognition algorithms, and natural language processing (NLP) algorithms.

2. The system of claim 1, wherein the at least one data processor is further caused to at least:
   detect a deactivation of the first input mode at the first client device; and
   detect, based at least on the deactivation of the first input mode, the activation of the second input mode at the first client device.

3. The system of claim 2, wherein the deactivation of the first input mode is detected based on a deselection of the user interface element associated with the first input mode or a selection of another user interface element associated with the first input mode.

4. The system of claim 1, wherein the user interface element comprises one or more of a button, a radio button, a checkbox, a toggle, and a dropdown menu.

5. The system of claim 1, wherein the first input mode is further activated by at least filtering the content captured at the first client device to remove the unauthorized content and/or at least the portion of the content associated with the unauthorized user.

6. The system of claim 5, wherein the filtering of the content captured at the first client device is performed at the first client device and/or a web conference server.

7. The system of claim 1, wherein the plurality of input devices includes two or more of a keyboard, a mouse, a microphone, and a camera associated with the first client device.

8. The system of claim 1, wherein the at least one data processor is further caused to at least:
respond to the activation of the second input mode at the first client device by at least enabling the plurality of input devices that are disabled while the first client device is in the first input mode.

9. The system of claim 1 wherein detecting the presence of an unauthorized user and/or unauthorized content comprises detecting the presence of the unauthorized user and/or unauthorized content within the web conference.

10. A computer-implemented method, comprising:
detecting, at a first client device engaged in a web conference session with a second client device, a selection of a user interface element associated with a first input mode in which at least a portion of content captured at the first client device is excluded from being shared with the second client device;
in response to the selection of the user interface element, activating the first input mode at the first client device by at least disabling a plurality of input devices associated with the first client device such that at least the portion of the content captured at the first client device is excluded from being shared with the second client device; and
in response to an activation of a second input mode at the first client device, sharing, with the second client device, the content captured at the first client device without restrictions;
wherein:
the first input mode is activated further in response to detecting a presence of unauthorized user and/or unauthorized content at the first client device; and
the presence of unauthorized user and/or unauthorized content is detected by applying one or more machine vision algorithms, voice recognition algorithms, and natural language processing (NLP) algorithms.

11. The method of claim 10, further comprising:
detecting a deactivation of the first input mode at the first client device; and
detecting, based at least on the deactivation of the first input mode, the activation of the second input mode at the first client device, the deactivation of the first input mode being detected based on a deselection of the user interface element associated with the first input mode or a selection of another user interface element associated with the first input mode.

12. The method of claim 10, wherein the user interface element comprises one or more of a button, a radio button, a checkbox, a toggle, and a dropdown menu.

13. The method of claim 10, wherein the first input mode is activated further in response to detecting a presence of unauthorized user and/or unauthorized content at the first client device.

14. The method of claim 13, wherein the presence of unauthorized user and/or unauthorized content is detected by applying one or more machine vision algorithms, voice recognition algorithms, and natural language processing (NLP) algorithms.

15. The method of claim 13, wherein the first input mode is further activated by at least filtering the content captured at the first client device to remove the unauthorized content and/or at least the portion of the content associated with the unauthorized user.

16. The method of claim 15, wherein the filtering of the content captured at the first client device is performed at the first client device and/or a web conference server.

17. The method of claim 10, wherein the plurality of input devices includes two or more of a keyboard, a mouse, a microphone, and a camera associated with the first client device.

18. The method of claim 10, further comprising:
responding to the activation of the second input mode at the first client device by at least enabling the plurality of input devices that are disabled while the first client device is in the first input mode.

19. A non-transitory computer readable medium storing instructions, which when executed by at least one data processor, result in operations comprising:
detecting, at a first client device engaged in a web conference session with a second client device, a selection of a user interface element associated with a first input mode in which at least a portion of content captured at the first client device is excluded from being shared with the second client device;
in response to the selection of the user interface element, activating the first input mode at the first client device by at least disabling a plurality of input devices associated with the first client device such that at least the portion of the content captured at the first client device is excluded from being shared with the second client device; and
in response to an activation of a second input mode at the first client device, sharing, with the second client device, the content captured at the first client device without restrictions;
wherein:
the first input mode is activated further in response to detecting a presence of unauthorized user and/or unauthorized content at the first client device; and
the presence of unauthorized user and/or unauthorized content is detected by applying one or more machine vision algorithms, voice recognition algorithms, and natural language processing (NLP) algorithms.

20. A system, comprising:
at least one data processor; and
at least one memory storing instructions, which when executed by the least one data processor, cause the at least one data processor to at least:
detect, at a first client device engaged in a web conference session with a second client device, a selection of a user interface element associated with a first input mode in which at least a portion of content captured at the first client device is excluded from being shared with the second client device;
in response to the selection of the user interface element, activate the first input mode at the first client device by at least disabling a plurality of input devices associated with the first client device such that at least the portion of the content captured at the first client device is excluded from being shared with the second client device; and in response to an activation of a second input mode at the first client device, share, with the second client device, the content captured at the first client device without restrictions;

wherein:

the first input mode is activated further in response to detecting a presence of unauthorized user and/or unauthorized content at the first client device; and detecting the presence of an unauthorized user and/or unauthorized content comprises detecting content contributed to the web conference by the unauthorized user.

* * * * *